United States Patent
Munemoto

(10) Patent No.: US 11,642,976 B2
(45) Date of Patent: May 9, 2023

(54) VEHICLE, CHARGING EQUIPMENT, AND CHARGING METHOD FOR VEHICLE

(71) Applicant: TOYOTA JIDOSHA KABUSHIKI KAISHA, Toyota (JP)

(72) Inventor: Kentaro Munemoto, Kuwana (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 155 days.

(21) Appl. No.: 17/223,198

(22) Filed: Apr. 6, 2021

(65) Prior Publication Data

US 2021/0380009 A1 Dec. 9, 2021

(30) Foreign Application Priority Data

Jun. 5, 2020 (JP) .............................. JP2020-098378

(51) Int. Cl.
*B60L 53/62* (2019.01)
*H02J 7/00* (2006.01)
*B60L 53/30* (2019.01)

(52) U.S. Cl.
CPC ............. *B60L 53/62* (2019.02); *B60L 53/305* (2019.02); *H02J 7/0049* (2020.01); *H02J 7/0071* (2020.01)

(58) Field of Classification Search
CPC .......... B60L 53/66; B60L 53/62; B60L 58/12; H02J 7/0049
See application file for complete search history.

(56) References Cited

U.S. PATENT DOCUMENTS

| 11,279,251 | B2 * | 3/2022 | Muramatsu ......... H04W 68/005 |
| 2011/0175569 | A1 * | 7/2011 | Austin .................... B60L 53/38 320/109 |
| 2019/0044345 | A1 * | 2/2019 | Komiyama ............. B60L 58/12 |
| 2020/0198490 | A1 * | 6/2020 | Ono ....................... B60L 53/11 |

FOREIGN PATENT DOCUMENTS

| JP | 2003-004824 A | 1/2003 |
| JP | 2010-054471 A | 3/2010 |

* cited by examiner

*Primary Examiner* — Richard Isla
*Assistant Examiner* — Sadia Kousar
(74) *Attorney, Agent, or Firm* — Oliff PLC

(57) ABSTRACT

In external charging, a first threshold voltage and a second threshold voltage which is lower than the first threshold voltage are set. The ECU permits start of charging of a battery when a voltage of the battery is lower than the second threshold voltage. The ECU stops charging of the battery and notifies the user that the battery has been fully charged using an HMI when the voltage of the battery is higher than the first threshold voltage during charging of the battery. The ECU notifies the user that the battery has been fully charged using the HMI when the voltage of the battery after charging of the battery has been stopped is lower than the first threshold voltage and is higher than the second threshold voltage.

8 Claims, 7 Drawing Sheets

<COMPARATIVE EXAMPLE>

<FIRST EMBODIMENT>

VEHICLE, CHARGING EQUIPMENT, AND CHARGING METHOD FOR VEHICLE

CROSS-REFERENCE TO RELATED APPLICATION

This application claims priority to Japanese Patent Application No. 2020-098378 filed on Jun. 5, 2020, incorporated herein by reference in its entirety.

BACKGROUND

1. Technical Field

The present disclosure relates to a vehicle, charging equipment, and a charging method for a vehicle.

2. Description of Related Art

Recently, electric vehicles (EV), plug-in hybrid vehicles (PHV), and the like have been becoming more widespread. Such vehicles are configured to charge an onboard battery with electric power which is supplied from outside of a vehicle. This charging is also referred to as "external charging." In external charging, it is determined whether a battery has reached a fully charged state and a user is preferably notified that the battery is in the fully charged state when the battery reaches the fully charged state (for example, see Japanese Unexamined Patent Application Publication No. 2003-004824 (JP 2003-004824 A)).

SUMMARY

Whether a battery is in a fully charged state is determined based on a threshold voltage. It is conceivable that only one threshold voltage be set. In this case, when the voltage of the battery is greater than the threshold voltage during external charging, it is determined that the battery has reached the fully charged state and charging of the battery is stopped. A user is notified that the battery is in the fully charged state.

Thereafter, when a state in which external charging is executable continues (for example, when a vehicle and charging equipment are connected via a charging cable), it is conceivable that starting conditions of the external charging be satisfied again. For example, the starting conditions may include a condition that a start time of timer charging arrives. Then, it is determined again whether the voltage of the battery is greater than the threshold voltage.

In a period from a time point at which it has been previously determined that the voltage of the battery is greater than the threshold voltage and the battery is in the fully charged state to a time point at which it is currently determined whether the voltage of the battery is greater than the threshold voltage, there is likelihood of the voltage of the battery decreasing due to various factors (which will be described later). When the voltage of the battery is currently less than the threshold voltage, the battery is charged again until the voltage of the battery reaches the threshold voltage.

At this time, an amount of electric power charged into the battery until the voltage of the battery reaches the threshold voltage is often small. A process of recharging the battery for such a small amount of electric power is complicated and it is preferable not to perform the process. A user may not easily understand why the battery is being recharged even though a full charged notification has been received. Accordingly, a user may feel a feeling of inconvenience.

Therefore, it is conceivable to set two threshold voltages. That is, a first threshold voltage and a second threshold voltage which is lower than the first threshold voltage are set.

The first threshold voltage is used to determine whether the battery has reached a fully charged state during charging of the battery. When the voltage of the battery is lower than the first threshold voltage, it is determined that the battery has not reached the fully charged state. In this case, charging of the battery continues. When the voltage of the battery is higher than the first threshold voltage, it is determined that the battery has reached the fully charged state. Then, charging of the battery is stopped and a user is notified that the battery is in the fully charged state.

The second threshold voltage is used to determine whether to start charging of the battery when a starting condition of external charging is satisfied. When the voltage of the battery is lower than the second threshold voltage, it is determined that charging of the battery is started. On the other hand, when the voltage of the battery is higher than the second threshold voltage, it is determined that charging of the battery will not be started (is not necessary).

In this way, when the voltage of the battery is higher than the first threshold voltage during external charging, it is determined that the battery has reached the fully charged state and charging of the battery is stopped. Thereafter, when the voltage of the battery decreases and the voltage of the battery at a time point at which the starting conditions of external charging have been satisfied is higher than the second threshold voltage, recharging of the battery is not performed. Accordingly, it is possible to curb a user's feeling of inconvenience described above.

However, when two threshold voltages are set, the inventor has noticed that the following problems may occur. When ending conditions of external charging are satisfied in a state in which the voltage of the battery is lower than the first threshold voltage during charging of the battery (for example, when an end time of timer charging arrives), charging of the battery is stopped. Thereafter, when the voltage of the battery decreases and the voltage of the battery at a time point at which the starting conditions of external charging are satisfied next time (for example, when a next start time of timer charging arrives) is higher than the second threshold voltage, recharging of the battery is not performed.

In this series of processes, a user is not notified that the battery is fully charged. Accordingly, there is a likelihood that the user will feel a feeling of inconvenience because charging of the battery is not started (or a notification is not received) even when the battery is not fully charged.

The disclosure provides a technique of curbing a driver's feeling of inconvenience in external charging.

(1) According to an aspect of the disclosure, there is provided a vehicle including: a power storage device; a control device configured to perform external charging of charging the power storage device using electric power supplied from the outside of the vehicle; and a notification device configured to notify a user of the vehicle that the power storage device has been fully charged by the external charging under the control of the control device. A first threshold voltage and a second threshold voltage which is lower than the first threshold voltage are set in the external charging. The control device is configured to permit start of charging of the power storage device when a voltage of the power storage device is lower than the second threshold voltage. The control device is configured to stop charging of the power storage device and to notify the user that the power storage device has been fully charged using the notification device when the voltage of the power storage device is higher than the first threshold voltage during charging of the power storage device. The control device is configured to notify the user that the power storage device has been fully charged using the notification device when the voltage of the power storage device after charging of the power storage device has been stopped is lower than the first threshold voltage and is higher than the second threshold voltage.

(2) The external charging may include timer charging of charging the power storage device in a period from a predetermined start time to an end time. The control device may be configured to permit start of charging of the power storage device when a start time of the timer charging arrives and to stop charging of the power storage device when an end time of the timer charging arrives.

In the configurations of (1) and (2), the control device permits start of charging of the power storage device when the voltage of the power storage device is lower than the second threshold voltage. Thereafter, when the voltage of the power storage device after charging of the power storage device has been stopped is lower than the first threshold voltage and higher than the second threshold voltage (that is, when an SOC of the power storage device is high to such an extent that charging is not started when a next charging time of the power storage device arrives), the control device notifies a user that the power storage device has been fully charged even when the voltage of the power storage device has not reached the first threshold voltage. Accordingly, the user can early understand that the power storage device is in (is close to) a fully charged state. Although details will be described later, a situation in which charging is not started or a full charged notification is not received does not occur in the next charging time. Accordingly, with the configurations of (1) and (2), it is possible to curb a driver's feeling of inconvenience in external charging.

(3) The control device may be configured to stop charging of the power storage device when another start time is determined after the end time of the timer charging and the voltage of the power storage device at the end time is lower than the second threshold voltage and to restart charging of the power storage device when the other start time arrives.

With the configuration of (3), since charging of the power storage device is restarted when another start time (a next start time) arrives, the power storage device can be brought close to the fully charged state and it is possible to increase a cruising distance of the vehicle.

(4) The control device may be configured to stop charging of the power storage device and to estimate the voltage of the power storage device at another start time when the other start time is determined after the end time and the voltage of the power storage device at the end time is higher than the second threshold voltage, and to notify the user that the power storage device has been fully charged when the estimated voltage is higher than the second threshold voltage.

(5) The control device may be configured to cause the vehicle to stand by in preparation for charging of the power storage device at the other start time when the estimated voltage is lower than the second threshold voltage.

(6) The control device may be configured to estimate the voltage of the power storage device at the other start time based on at least one of a charging voltage and a charging current of the power storage device and an outside air temperature during charging of the power storage device.

With the configurations of (4) to (6), when the voltage of the power storage device is estimated to be lower than the second threshold voltage at another start time (a next start time, the power storage device can be recharged at the next start time without transmitting a full charged notification to a user. Accordingly, by charging at the next start time, the power storage device can be brought close to the fully charged state and it is possible to increase a cruising distance of the vehicle.

(7) According to another aspect of the disclosure, there is provided charging equipment that supplies electric power for external charging of charging a power storage device which is mounted in a vehicle. The charging equipment includes: a notification device configured to notify a user of the vehicle that the power storage device has been fully charged by the external charging; and a control device configured to control the notification device. In the external charging, a first threshold voltage and a second threshold voltage which is lower than the first threshold voltage are set. The control device is configured to permit start of supply of electric power to the vehicle when a voltage of the power storage device is lower than the second threshold voltage. The control device is configured to stop supply of electric power to the vehicle and to notify the user that the power storage device has been fully charged using the notification device when the voltage of the power storage device is higher than the first threshold voltage during charging of the power storage device. The control device is configured to notify the user that the power storage device has been fully charged using the notification device when the voltage of the power storage device after supply of electric power to the vehicle has been stopped is lower than the first threshold voltage and is higher than the second threshold voltage.

With the configuration of (7), it is possible to curb a driver's feeling of inconvenience in external charging similarly to the configuration of (1).

(8) According to another aspect of the disclosure, there is provided a charging method for a vehicle, in which the vehicle is configured to perform external charging of charging a power storage device with electric power which is supplied from the outside of the vehicle. In the external charging, a first threshold voltage and a second threshold voltage which is lower than the first threshold voltage are set. The charging method includes first to third steps. The first step is a step of permitting start of charging of the power storage device when a voltage of the power storage device is lower than the second threshold voltage. The second step is a step of stopping charging of the power storage device and notifying the user that the power storage device has been fully charged using the notification device when the voltage of the power storage device is higher than the first threshold voltage during charging of the power storage device. The third step is a step of notifying the user that the power storage device has been fully charged using the notification device when the voltage of the power storage device after charging of the power storage device has been stopped is lower than the first threshold voltage and is higher than the second threshold voltage.

With the method of (8), it is possible to curb a driver's feeling of inconvenience in external charging similarly to the configuration of (1).

According to the disclosure, it is possible to curb a driver's feeling of inconvenience in external charging.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
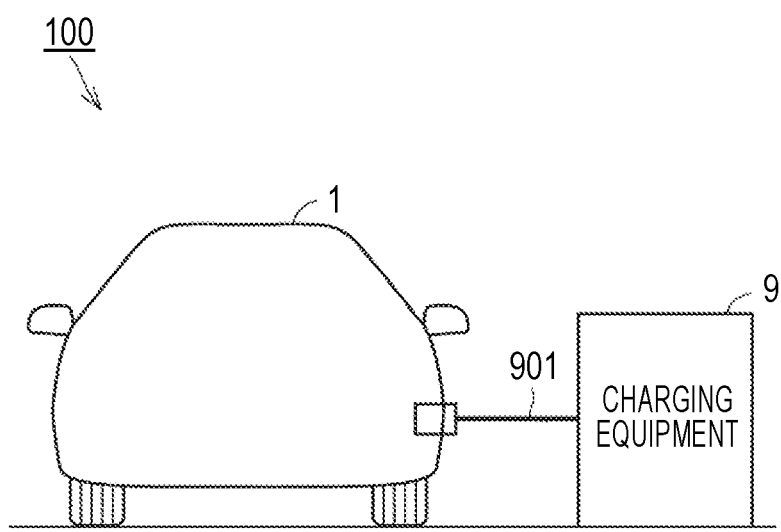
FIG. 1 is a diagram illustrating an example of external charging which is performed by a charging system according to a first embodiment of the disclosure.

Hereinafter, embodiments of the disclosure will be described in detail with reference to the accompanying drawings. In the drawings, the same or corresponding elements will be referred to by the same reference signs and description thereof will not be repeated.

First Embodiment

Configuration of Vehicle

FIG. 1 is a diagram illustrating an example of external charging which is performed by a charging system according to a first embodiment of the disclosure. Referring to FIG. 1, the charging system 100 includes a vehicle 1 and charging equipment 9. FIG. 1 illustrates an example in which the vehicle 1 and the charging equipment 9 are electrically connected via a charging cable 901. Accordingly, electric power from the charging equipment 9 is supplied to the vehicle 1 via the charging cable 901, and a battery 5 (see FIG. 2) which is mounted in the vehicle 1 is charged.

The vehicle 1 is, for example, an electric vehicle. Here, the vehicle 1 may be a plug-in hybrid vehicle, a fuel-cell vehicle, or the like as long as it is a vehicle configured to enable external charging.

The charging equipment 9 is, for example, a dedicated charger that is provided in the home of a user of the vehicle 1. The charging equipment 9 may be a charger that is provided in a public charging stand (also referred to as a charging spot).

Figure 2:
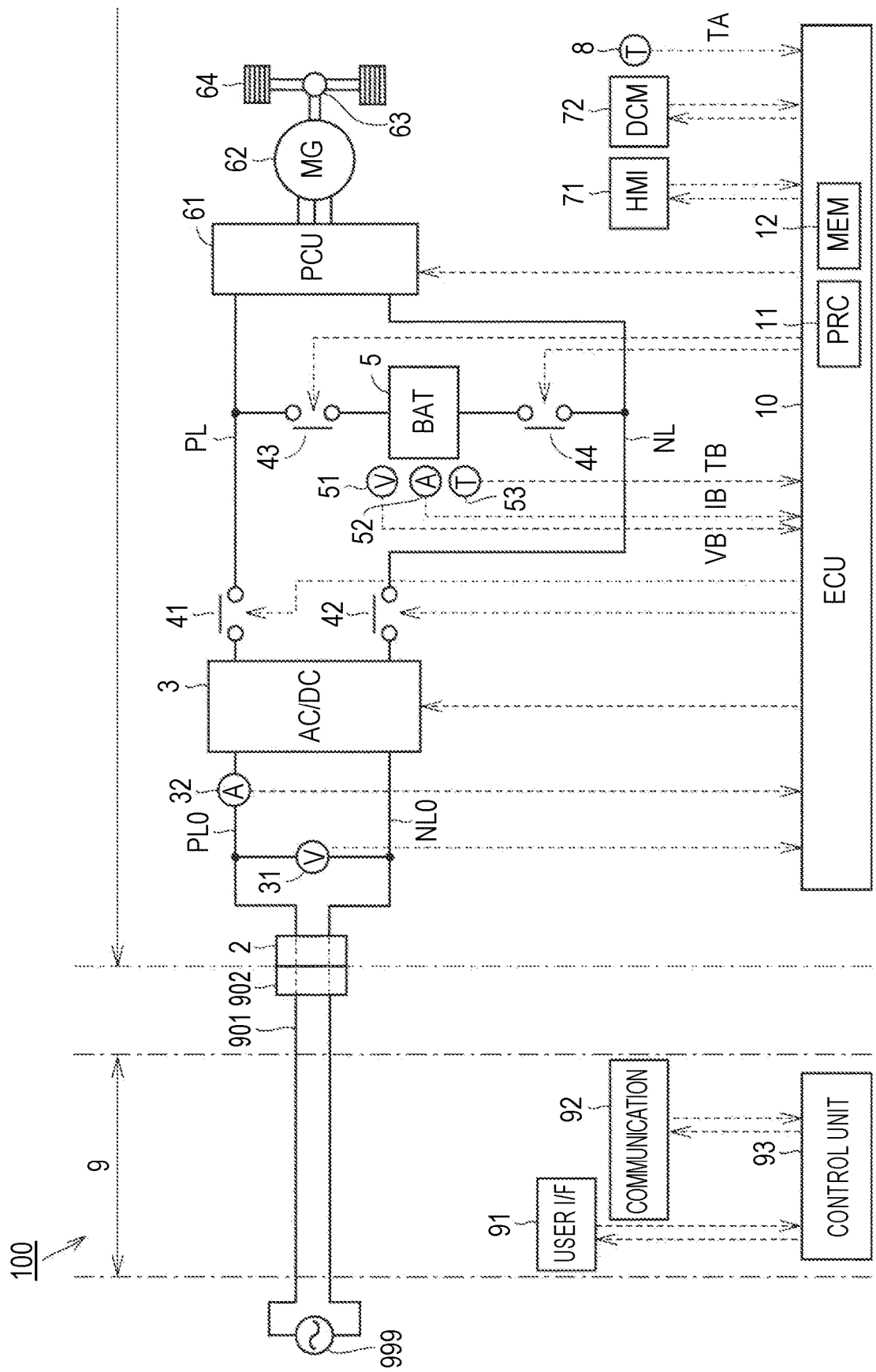
FIG. 2 is a block diagram schematically illustrating a configuration of the charging system according to the first embodiment.

FIG. 2 is a block diagram schematically illustrating a configuration of the charging system 100 according to the first embodiment. Referring to FIG. 2, the charging equipment 9 is an AC charger (so-called normal charger) in this example. On the other hand, the charging equipment 9 may be a DC charger (a quick charger). The charging equipment 9 includes a user interface 91, a communication module 92, and a control unit 93.

The user interface 91 is, for example, a display with a touch panel. The user interface 91 receives a user's operation and provides various types of information to a user. The user interface 91 may be a device (for example, a smart speaker) that inputs/outputs voice.

The communication module 92 is used for communication between the charging equipment 9 and the vehicle 1 via the charging cable 901. The communication module 92 can also be used to provide information to a user's mobile terminal (a smartphone or the like).

The control unit 93 performs a series of processes for realizing external charging of the vehicle 1 in cooperation with an ECU 10 of the vehicle 1. The control unit 93 controls the user interface 91 and the communication module 92.

The vehicle 1 includes an inlet 2, power lines PL0 and NL0, an AC/DC converter 3, power lines PL and NL, a voltage sensor 31, a current sensor 32, charging relays 41 and 42, system main relays (SMR) 43 and 44, a battery 5, a voltage sensor 51, a current sensor 52, a temperature sensor 53, a power control unit (PCU) 61, a motor generator 62, a power transmission gear 63, driving wheels 64, a human-machine interface (HMI) 71, a data communication module (DCM) 72, an outside air temperature sensor 8, and an electronic control unit (ECU) 10.

The inlet (a charging port) 2 is configured such that a connector 902 provided at a tip of the charging cable 901 can be inserted thereinto with mechanical connection such as fitting. With insertion of the connector 902 into the inlet 2, electrical connection between the vehicle 1 and the charging equipment 9 is thus secured. The ECU 10 of the vehicle 1 and the control unit 93 of the charging equipment 9 can transmit and receive various commands and data in accordance with a communication standard such as a controller area network (CAN). The inlet 2 and the AC/DC converter 3 are electrically connected to each other via the power lines PL0 and NL0.

The voltage sensor 31 is electrically connected between the power line PL0 and the power line NL0. The voltage sensor 31 detects a DC voltage between the power line PL0 and the power line NL0 and outputs the result of detection to the ECU 10. The current sensor 32 detects a current flowing in the power line PL0 and outputs the result of detection to the ECU 10. The ECU 10 can calculate electric power supplied from the charging equipment 9 to the vehicle 1 (charging electric power of the battery 5) based on the results of detection from the voltage sensor 31 and the current sensor 32.

The AC/DC converter 3 converts AC electric power supplied from the charging equipment 9 via the charging cable 901 to DC electric power for charging the battery 5. The conversion of electric power in the AC/DC converter 3 can be performed in a combination of AC/DC conversion for improvement of a power factor and DC/DC conversion for adjustment of a voltage level. DC electric power from the AC/DC converter 3 is output to the power lines PL and NL.

The charging relay 41 is electrically connected to the power line PL. The charging relay 42 is electrically connected to the power line NL. The SMR 43 is electrically connected between the power line PL and a positive electrode of the battery 5. The SMR 44 is electrically connected to the power line NL and a negative electrode of the battery 5. The charging relays 41 and 42 are closed in accordance with an instruction from the ECU 10, and transmission of electric power between the inlet 2 and the battery 5 is possible when the SMRs 43 and 44 are closed.

The battery 5 is a battery pack including a plurality of cells (not illustrated). The battery pack may include a module (block) in which a plurality of cells is connected in series and/or in parallel to each other. Each cell is a secondary battery such as a lithium-ion battery or a nickel-hydride battery. In the disclosure, since an internal structure of the battery 5 does not matter, the battery 5 is simply mentioned in the following description. The battery 5 supplies electric power for generating a driving force of the vehicle 1. The battery 5 stores electric power which is generated by the motor generator 62. A capacitor such as an electrical double-layer capacitor may be employed instead of the battery 5. The battery 5 corresponds to a "power storage device" in the claims of the disclosure.

The voltage sensor 51 detects a voltage VB of the battery 5. The current sensor 52 detects a current IB which is charged into and discharged from the battery 5. The temperature sensor 53 detects a temperature TB of the battery 5. The sensors output signals indicating results of detection thereof to the ECU 10.

The PCU 61 is electrically connected between the power lines PL and NL and the motor generator 62. The PCU 61 includes a converter and an inverter (none of which is illustrated) and drives the motor generator 62 in accordance with an instruction from the ECU 10.

The motor generator 62 is an AC rotary machine and is, for example, a permanent magnet type synchronous electric motor including a rotor with a permanent magnet embedded therein. An output torque of the motor generator 62 is transmitted to the driving wheels 64 via the power transmission gear 63 and causes the vehicle 1 to travel. The motor generator 62 can generate electric power using a rotational force of the driving wheels 64 at the time of a braking operation of the vehicle 1. Electric power generated by the motor generator 62 is converted to charging electric power of the battery 5 by the PCU 61.

Similarly to the user interface 91 of the charging equipment 9, the HMI 71 receives a user's operation and provides various types of information to a user. The HMI 71 may include, for example, an instrument penal, a display with a touch panel of a navigation system (a navigation screen), a head-up display (HUD), operation buttons, and a smart speaker.

The DCM 72 is configured to enable bidirectional communication between the vehicle 1 and an external server. In this embodiment, the DCM 72 can also communicate with a user's mobile terminal. At least one of the HMI 71 and the DCM 72 corresponds to a "notification device" in the claims of the disclosure.

The outside air temperature sensor 8 detects a temperature of outside air (an outside air temperature TA) of the vehicle 1, and outputs a signal indicating the result of detection to the ECU 10.

The ECU 10 includes a processor 11 such as a central processing unit (CPU), a memory 12 such as a read only memory (ROM) and a random access memory (RAM), and input and output ports (not illustrated). The ECU 10 controls various devices such that the vehicle 1 is in a desired state in accordance with signals from the sensors and the like. The ECU 10 may be configured as a plurality of ECUs which is divided by functions.

As principal control which is performed by the ECU 10 in this embodiment, external charging of charging the battery 5 with electric power which is supplied from the charging equipment 9 via the charging cable 901 can be considered. Particularly, in this embodiment, the ECU 10 performs "timer charging" which is a kind of external charging. In timer charging, external charging is performed in accordance with a predetermined charging schedule. Timer charging according to a comparative example will be first described below for the purpose of easy understanding of features of timer charging according to this embodiment.

Full Charging Determination in Timer Charging

Figure 3:
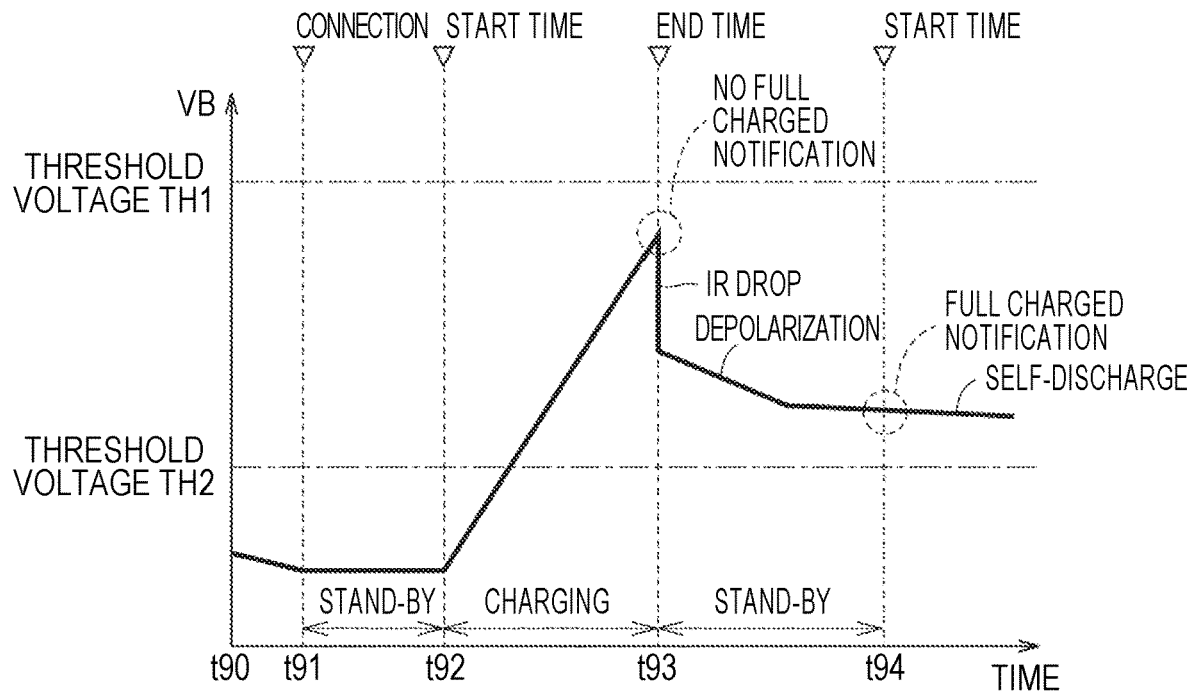
FIG. 3 is a timing chart illustrating timer charging control in a comparative example.
Figure 4:
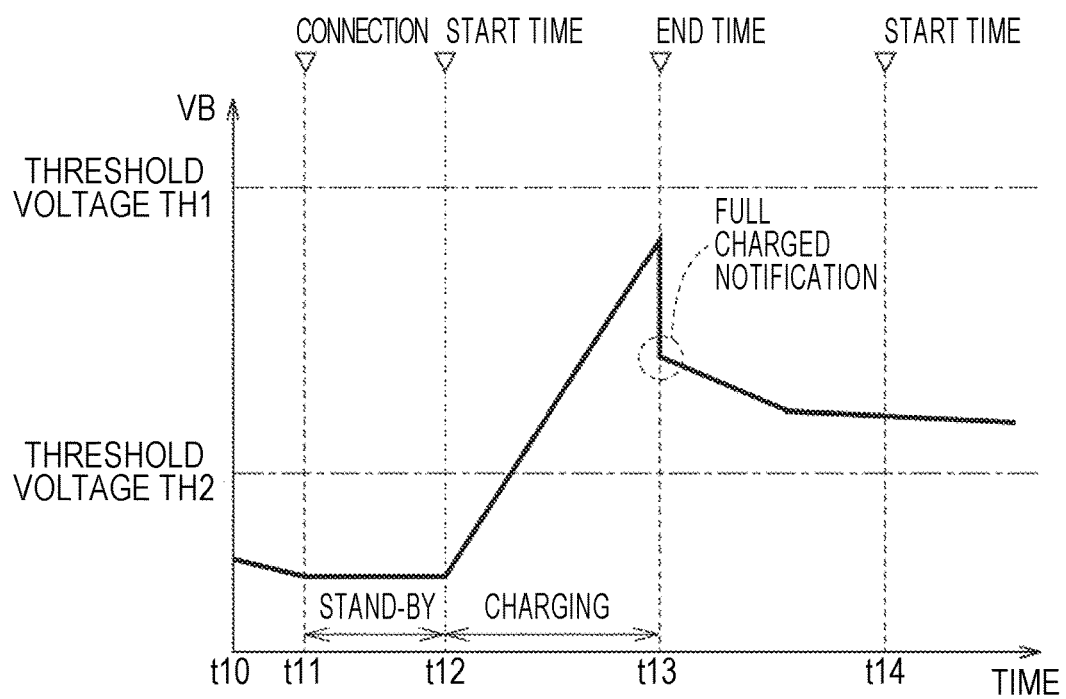
FIG. 4 is a timing chart illustrating timer charging control according to the first embodiment.

FIG. 3 is a timing chart illustrating timer charging according to a comparative example. In FIG. 3 and FIG. 4 which will be described later, the horizontal axis represents an elapsed time. The vertical axis represents the voltage VB (a closed-circuit voltage) of the battery 5. In the vertical axis, two threshold voltages TH1 and TH2 are set. The threshold voltage TH2 is lower than the threshold voltage TH1. A difference between the threshold voltage TH1 and the threshold voltage TH2 (TH1−TH2) is, for example, about several % in view of an SOC of the battery 5.

The threshold voltage TH1 (a "first threshold voltage" in the claims of the disclosure) is used to determine whether the battery 5 has reached a fully charged state during charging of the battery 5. When the voltage VB of the battery 5 is lower than the threshold voltage TH1, it is determined that the battery 5 has not reached the fully charged state. When the voltage VB of the battery 5 is equal to or higher than the threshold voltage TH1, it is determined that the battery 5 has reached the fully charged state.

The threshold voltage TH2 (a "second threshold voltage" in the claims of the disclosure) is used to determine whether to start charging of the battery 5 (whether start of charging is permitted) when a start time of timer charging arrives (when starting conditions of external charging are satisfied). When the voltage of the battery 5 is lower than the threshold voltage TH2, it is determined that charging of the battery 5 will be started (start of charging is permitted). On the other hand, when the voltage VB of the battery 5 is equal to or higher than the threshold voltage TH2, it is determined that charging of the battery 5 will not be started (start of charging is not permitted).

A charging schedule of timer charging is determined, for example, based on electricity charges. When the electricity charge in a late-night time line of one day is the lowest, charging of the battery 5 (supply of electric power to the vehicle 1) is performed in the late-night time line. For example, a start time of timer charging may be 11 o'clock P.M. (23:00) and an end time of timer charging may be 8 o'clock A.M.

Referring to FIG. 3, the voltage VB of the battery 5 is lower than the threshold voltage TH2 at an initial time t90. At time t91, the connector 902 of the charging cable 901 is connected to the inlet 2 of the vehicle 1. Thereafter, the vehicle 1 stands by in a state in which the battery 5 is chargeable up to a start time t92 of timer charging.

When the start time t92 arrives, it is determined whether the battery 5 is to be charged (start of charging is permitted) based on a relationship between the voltage VB of the battery 5 and the threshold voltage TH2. When the voltage VB of the battery 5 is lower than the threshold voltage TH2 as illustrated in FIG. 3, it is determined that charging of the battery 5 is necessary, and charging of the battery 5 is started. Accordingly, after the start time t92, the voltage VB of the battery 5 starts increasing. In this example, the voltage VB increases monotonously until an end time t93 of timer charging arrives.

In a period from the start time t92 of timer charging to the end time t93, it is periodically determined whether the battery 5 has reached the fully charged state based on a relationship between the voltage VB of the battery 5 and the threshold voltage TH1. In the example illustrated in FIG. 3, in a state in which the voltage VB of the battery 5 is lower than the threshold voltage TH1, the end time t93 arrives and charging of the battery 5 is stopped. In this case, the end time t93 arrives before the battery 5 reaches the fully charged state and the user is not notified that the battery 5 has reached the fully charged state. In the following description, this notification is also referred to as a "full charged notification."

When charging of the battery 5 is stopped at the end time t93, the voltage VB of the battery 5 decreases. More specifically, the voltage VB decreases by a product of the charging current IB and an internal resistance R in the battery 5 (IR drop). Polarization generated in the battery 5 during charging is typically gradually released over several tens of minutes after charging of the battery 5 has been stopped. For this reason, the voltage VB also decreases. The voltage VB can also decrease due to self-discharge of the battery 5.

Here, it is assumed that a next start time t94 (for example, 11 O'clock P.M.) arrives without a user's going out by the vehicle 1 after charging of the battery 5 has been stopped at the end time t93 (for example, 8 O'clock A.M.). In this case, it is determined again whether the battery 5 is to be charged based on the relationship between the voltage VB of the battery 5 and the threshold voltage TH2. At this time, since the voltage VB of the battery 5 is equal to or higher than the threshold voltage TH2, charging of the battery 5 is not necessary and charging is not started (start of charging is not permitted).

It can also be considered that a full charged notification is transmitted to the user at the second start time t94. However, in this case, the user stands by without receiving a full charged notification from the end time t93 to the start time t94. There is a likelihood that the user will feel a feeling of inconvenience because the user has not received the full charged notification at the end time t93 but has received the full charged notification at the start time t94.

On the other hand, when the user has not received the full charged notification at the second start time t94, the user cannot ascertain whether the battery 5 is in the fully charged state. Accordingly, there is a likelihood that the user will feel a feeling of inconvenience because the battery 5 has not reached the fully charged state and charging is not started even at the start time t94.

Therefore, in this embodiment, the configuration in which the threshold voltage TH1 is used to determine whether the battery 5 is in the fully charged state in a period from the start time t92 of timer charging to the end time t93 thereof and the threshold voltage TH2 is used to determine whether the battery 5 is in the fully charged state when the end time t93 of timer charging arrives is employed. When the voltage VB of the battery 5 is equal to or higher than the threshold voltage TH2 at the end time t93, the battery 5 is determined to be fully charged and the full charged notification is transmitted to the user even if the voltage VB is lower than the threshold voltage TH1. Accordingly, it is possible to curb a user's feeling of inconvenience described above.

FIG. 4 is a timing chart illustrating timer charging according to the first embodiment. Referring to FIG. 4, the process in a period of time from an initial time t10 to an end time t13 is the same as the process in the corresponding period of time in the comparative example (see FIG. 3).

At the end time t13, charging of the battery 5 is stopped. In the first embodiment, the voltage VB of the battery 5 and the threshold voltage TH2 are compared. In the example illustrated in FIG. 4, the voltage VB of the battery 5 is equal to or higher than the threshold voltage TH2. Then, it is determined that the battery 5 has reached the fully charged state.

In this way, when the voltage VB of the battery 5 is lower than the threshold voltage TH1 and the voltage VB is equal to or greater than the threshold voltage TH2 at the end time t13, the battery 5 is determined to be fully charged and a full charged notification is transmitted to the user. Accordingly, the user can early receive the full charged notification. The vehicle 1 ends a series of processes without standing by in a state in which it is chargeable up to a next start time t14. Accordingly, it is possible to omit a complicated process for recharging the battery 5.

Charging Control Flow

Figure 5:
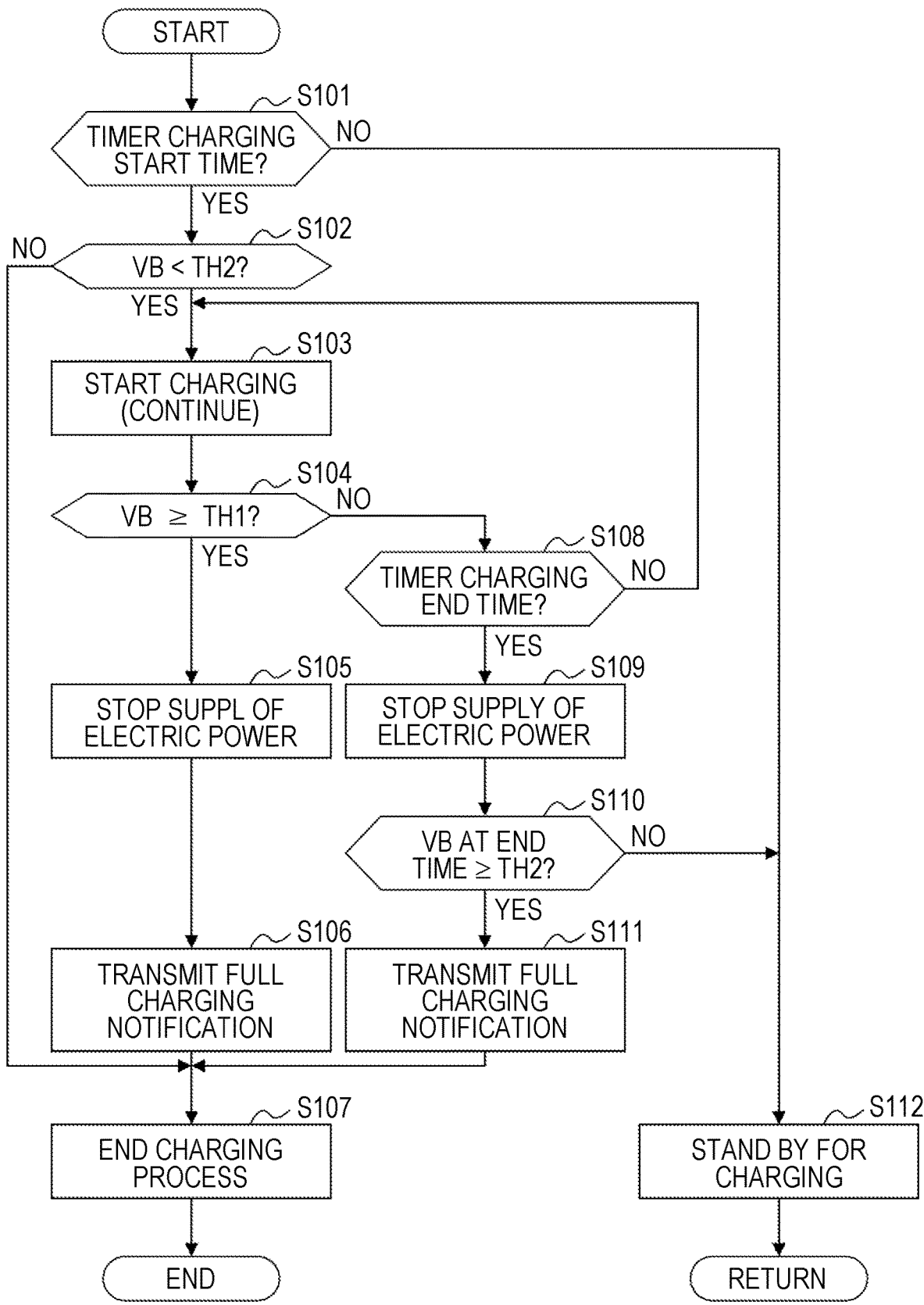
FIG. 5 is a flowchart illustrating timer charging control according to the first embodiment.

FIG. 5 is a flowchart illustrating timer charging control according to the first embodiment. For example, this flowchart is called and performed by a main routine (not illustrated) in each of predetermined operation cycles in a state in which the connector 902 of the charging cable 901 is connected to the inlet 2 of the vehicle 1. The steps are realized by a software process which is performed by the ECU 100, but may be realized by hardware (an electrical circuit) incorporated in the ECU 100. In the following description, Step is abbreviated to S.

Referring to FIG. 5, in S101, the ECU 100 determines whether a start time of timer charging has arrived. When the start time of timer charging has not arrived (NO in S101), the ECU 100 stands by for charging of the battery 5 (S112). When the start time of timer charging has arrived (YES in S101), the ECU 100 causes the flow of processes to proceed to S102.

In S102, the ECU 100 determines whether the voltage VB of the battery 5 is lower than the threshold voltage TH2. When the voltage VB of the battery 5 is equal to or higher than the threshold voltage TH2 (NO in S102), the voltage VB of the battery 5 is sufficiently high already and charging of the battery 5 is not necessary. Accordingly, the ECU 100 causes the flow of processes to proceed to S107 without permitting start of charging and ends a series of charging processes.

When the voltage VB of the battery 5 is lower than the threshold voltage TH2 (YES in S102), the ECU 100 determines that charging of the battery 5 is necessary and starts charging of the battery 5 (permits start of charging) (S103) (see time t12 in FIG. 4).

During charging of the battery 5, the ECU 100 monitors whether the voltage VB of the battery 5 has reached the threshold voltage TH1 (S104). When the voltage VB of the battery 5 has reached the threshold voltage TH1 (YES in S104), the ECU 100 determines that the battery 5 has reached the fully charged state, and stops supply of electric power to the battery 5 by controlling the AC/DC converter 3 (S105). Then, the ECU 100 notifies the user that the battery 5 is fully charged by controlling the HMI 71 and/or the DCM 72 (S106). Thereafter, a series of charging processes end (S107).

On the other hand, when the voltage VB of the battery 5 during charging is lower than the threshold voltage TH1 (NO in S104), the ECU 100 determines whether the end time of timer charging has arrived (S108). When the end time of timer charging has not arrived yet (NO in S107), the flow of processes returns to S103 and charging of the battery 5 continues.

When the end time of timer charging has arrived in a state in which the voltage VB of the battery 5 has not reached the threshold voltage TH1 (YES in S108), the ECU 100 stops supply of electric power to the battery 5 by controlling the AC/DC converter 3 (S109). Then, the ECU 100 determines whether the voltage VB of the battery 5 after being stopped is equal to or higher than the threshold voltage TH2 (S110).

When the voltage VB of the battery 5 is equal to or higher than the threshold voltage TH2 (YES in S110), the ECU 100 causes the flow of processes to proceed to S111 and notifies the user that the battery 5 is fully charged by controlling the HMI 71 and/or the DCM 72 (see time t13 in FIG. 4) similarly to S106.

On the other hand, when the voltage VB of the battery 5 is lower than the threshold voltage TH2 (NO in S110), the ECU 100 causes the flow of processes to proceed to S112 and stands by for charging of the battery 5 up to the next charging time (a chargeable state is maintained). In this case, the flow of processes returns to the main routine and a series of processes from S101 are performed again with the elapse of the next operation cycle. As a result, charging of the battery 5 is restarted when the next start time of timer charging arrives.

As described above, in the first embodiment, when the voltage VB of the battery 5 is equal to or higher than the threshold voltage TH2 at the end time of timer charging (that is, when the SOC of the battery 5 is so high that charging will not be started even when the next start time of timer charging arrives), a full charged notification is transmitted to the user even if the voltage VB has not reached the threshold voltage TH1. Accordingly, the user can early understand that the battery 5 is in (close to) the fully charged state. Then, a situation in which the user receives a full charged notification at the next start time is prevented. In addition, a situation in which the user has not received a full charged notification but charging is not started at the next start time is prevented. Accordingly, according to the first embodiment, it is possible to curb a user's feeling of inconvenience.

The ECU 100 ends the charging processes (S107) without standing by in a chargeable state up to the next start time of timer charging (S112). Accordingly, it is not necessary to perform a complicated process in preparation for recharging of the battery 5 and thus it is possible to simplify the processes.

Second Embodiment

The voltage VB of the battery 5 decreases after charging of the battery 5 has been stopped. An amount of drop of the voltage VB (an amount of voltage drop $\Delta V$) may vary depending on characteristics of the battery 5, an environment of the battery 5, or the like. In the second embodiment, a configuration for estimating the amount of voltage drop $\Delta V$ after charging of the battery 5 has been stopped and reflecting the result of estimation in charging control of the battery 5 will be described below. The configuration of a vehicle according to the second embodiment is the same as the configuration of the vehicle 1 according to the first embodiment (see FIG. 2).

As described above with reference to FIG. 3, the amount of voltage drop $\Delta V$ of the battery 5 includes a component based on the IR drop of the battery 5, a component based on depolarization of the battery 5, and a component based on self-discharge of the battery 5. For example, the amount of voltage drop $\Delta V$ can be calculated by preparing a map in consideration of the three components in advance and storing the map in the memory 12 of the ECU 100.

Figure 6:
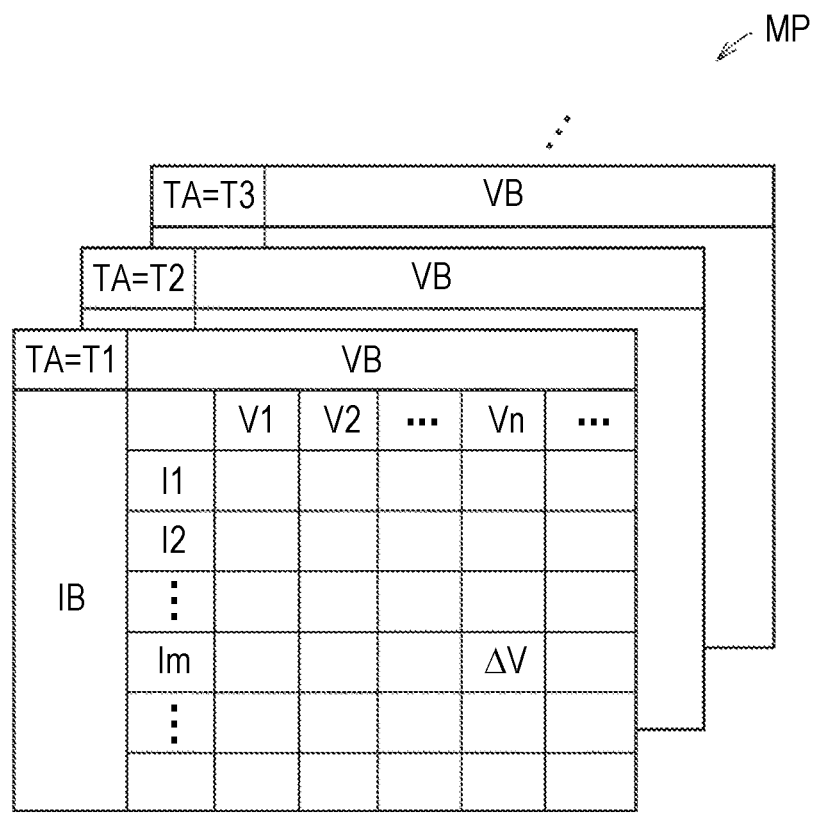
FIG. 6 is a conceptual diagram illustrating an example of a map which is used to estimate an amount of voltage drop of a battery.

FIG. 6 is a conceptual diagram illustrating an example of a map MP for estimating the amount of voltage drop $\Delta V$ of the battery 5. In the example illustrated in FIG. 6, the map MP is a three-dimensional map. Parameters defining the map MP include a charging voltage of the battery 5 (a voltage VB), a charging current of the battery 5 (a current IB), and an outside air temperature TA.

The amount of voltage drop $\Delta V$ from the charging voltage, the charging current, and the outside air temperature TA of the battery 5 can be calculated with reference to the map MP. More specifically, the amount of voltage drop $\Delta V$ increases as the charging electric power of the battery increases (the charging voltage and/or the charging current of the battery 5 increases). The amount of voltage drop $\Delta V$ is likely to increase as a difference between the outside air temperature TA and the normal temperature increases.

The map MP which was prepared in advance may be used as described above, or the map MP which was prepared in advance may be updated using the actual amount of voltage drop $\Delta V$ (for example, a measured value of a slope with which the voltage VB decreases). In other words, the amount of voltage drop $\Delta V$ in a situation in which the vehicle 1 is actually used may be learned and the result of learning may be reflected in the map MP.

In the map MP illustrated in FIG. 6, influences of all the three components are integrated into one in consideration of the influences of the three components contributing to the amount of voltage drop $\Delta V$. However, a map may be prepared for each component. That is, the number of maps used to estimate the amount of voltage drop $\Delta V$ is not limited to one and may be two or more. For example, a map for estimating an amount of voltage drop based on depolarization of the battery 5 and a map for estimating an amount of voltage drop based on self-discharge of the battery 5 may be separately prepared. In this case, the amount of voltage drop based on the IR drop of the battery 5 can be simply calculated by a product of the charging current (IB) of the battery 5 and the internal resistance R of the battery 5. The internal resistance R may be a fixed value or a variable value depending on the temperature and/or the SOC of the battery 5.

The map MP is not necessarily a three-dimensional map. Although estimation accuracy of the amount of voltage drop $\Delta V$ may decrease, the map MP may be a one-dimensional map including only one of the charging voltage, the charging current, and the outside air temperature TA of the battery 5 or may be a two-dimensional map including only two thereof.

Instead of the voltage sensor 51, the voltage sensor 31 may be used to acquire the charging voltage of the battery 5. Instead of the current sensor 52, the current sensor 32 may be used to acquire the charging current of the battery 5.

Figure 7A:
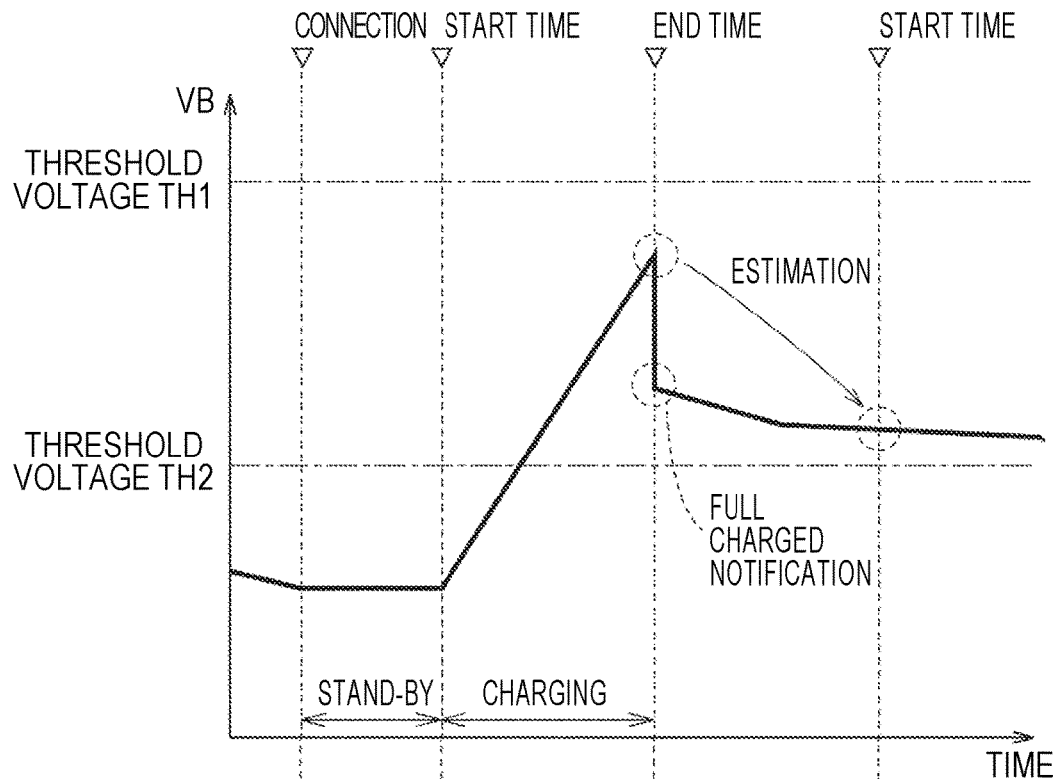
FIGS. 7A and 7B are timing charts illustrating timer charging control according to a second embodiment.
Figure 7B:
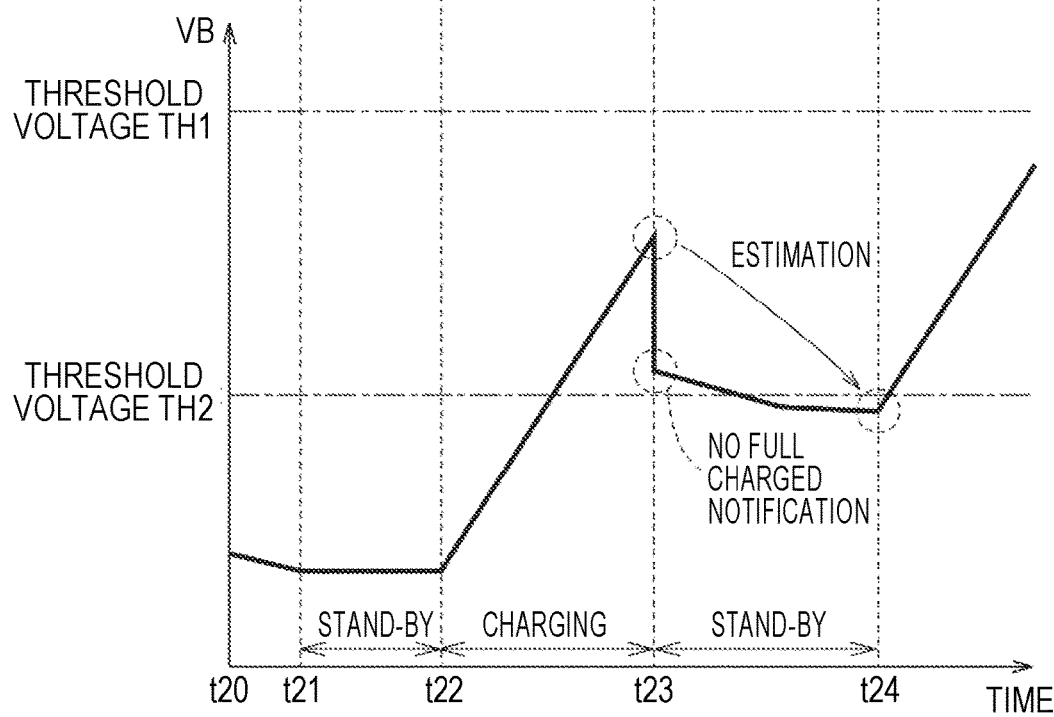

FIG. 7A and FIG. 7B are a timing chart illustrating timer charging according to the second embodiment. Referring to FIG. 7A and FIG. 7B, processes up to the end time t23 are the same as the processes up to the end time t13 in the first embodiment (see FIG. 4) and thus description thereof will not be repeated.

At the end time t23, charging of the battery 5 is stopped. Then, in the second embodiment, the voltage VB of the battery 5 and the threshold voltage TH2 are compared similarly to the first embodiment. In this example, the voltage VB of the battery 5 at the end time t23 is equal to or higher than the threshold voltage TH2.

In the second embodiment, at the end time t23, the amount of voltage drop $\Delta V$ of the battery 5 up to the next start time t24 of timer charging is calculated. The map MP illustrated in FIG. 6 can be used for this calculation. As a result, the voltage VB(t24) at the next start time t24 can be calculated by subtracting the amount of voltage drop $\Delta V$ from the voltage VB(t23) at the end time t23 (see Expression (1)). The calculated voltage VB(t24) and the threshold voltage TH2 are compared.

$$VB(t24)=VB(t23)-\Delta V \quad (1)$$

When the voltage VB(t24) of the battery 5 is estimated to be kept equal to or higher than the threshold voltage TH2, it is determined that the battery 5 has reached the fully charged state and a full charged notification is transmitted to the user at the end time t23 (see FIG. 7A).

On the other hand, when the voltage VB(t24) of the battery 5 is estimated to become lower than the threshold voltage TH2, a full charged notification is not transmitted to the user at the end time t23. The vehicle 1 stands by for charging up to the next start time t24. Then, when the start time t24 arrives, the battery 5 is recharged (see FIG. 7B).

In this way, in the second embodiment, the voltage VB of the battery 5 at the next start time t24 of timer charging is estimated at the end time t23 of timer charging. When the voltage VB at the start time t24 is estimated to be equal to or higher than the threshold voltage TH2, a full charged notification is early transmitted to the user and it is possible to curb the user's feeling of convenience. On the other hand, when the voltage VB at the start time t24 is estimated to be lower than the threshold voltage TH2, the battery 5 can be brought close to the fully charged state by causing the vehicle to stand by such that the battery 5 is rechargeable from the start time t24.

Figure 8:
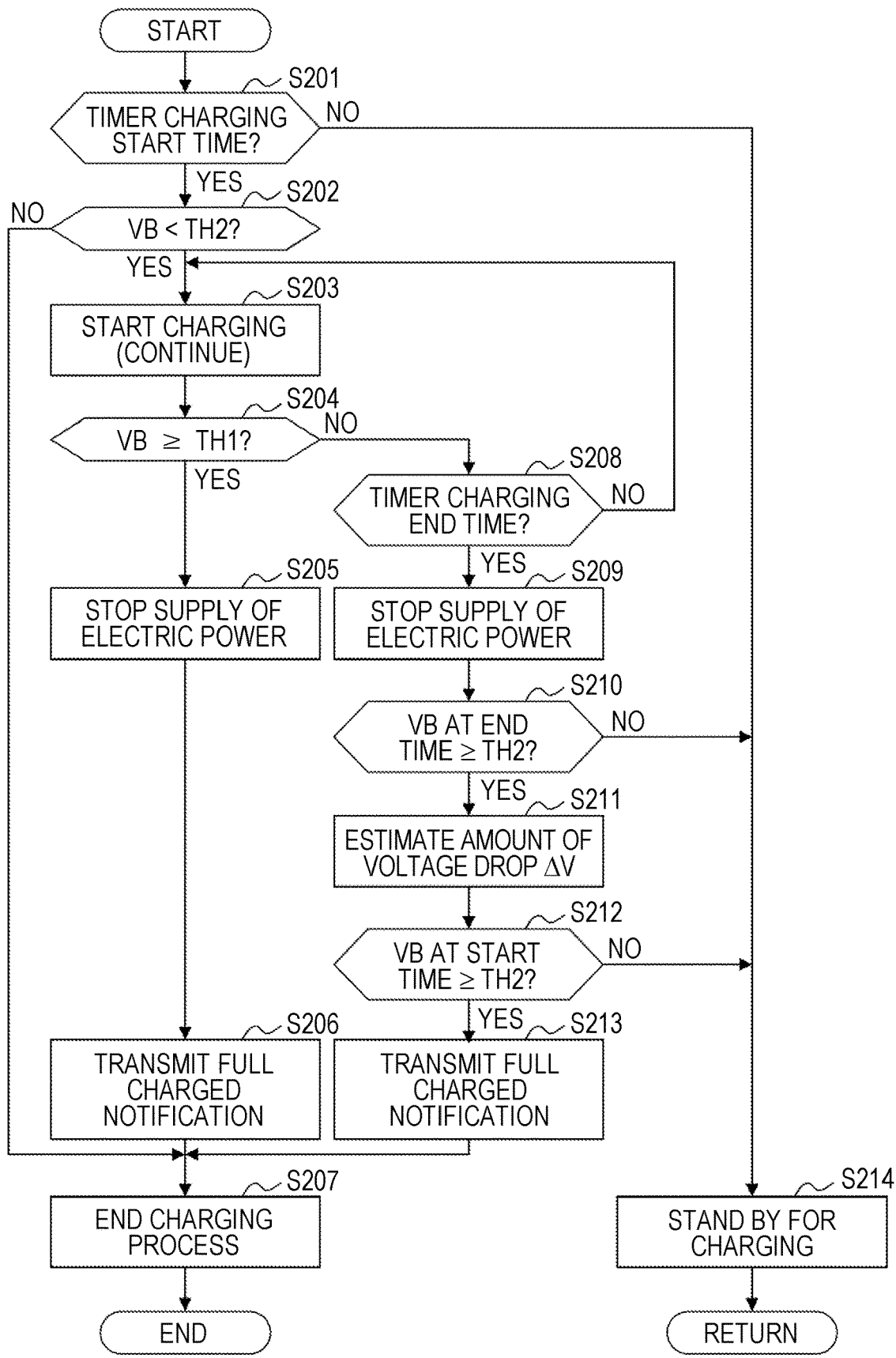
FIG. 8 is a flowchart illustrating timer charging control according to the second embodiment.

FIG. 8 is a flowchart illustrating timer charging control according to the second embodiment. Referring to FIG. 8, this flowchart is different from the flowchart illustrating timer charging control according to the first embodiment (see FIG. 5) in that the processes of S211 and S212 are further provided. The processes of S201 to S210 are the same as the corresponding processes in the first embodiment.

When an end time of timer charging arrives in a state in which the voltage VB of the battery 5 has not reached the threshold voltage TH1 (YES in S208), the ECU 100 stops supply of electric power to the battery 5 by controlling the AC/DC converter 3 (S209). Then, the ECU 100 determines whether the voltage VB of the battery 5 at the end time of timer charging (the voltage VB after supply of electric power to the battery 5 has been stopped) is equal to or higher than the threshold voltage TH2 (S210).

When the voltage VB at the end time is equal to or higher than the threshold voltage TH2 (YES in S210), the ECU 100 estimates the amount of voltage drop ΔV of the battery 5 in a period of time from the end time of timer charging to the next start time (S211). The method of estimating the amount of voltage drop ΔV is the same as described above in detail with reference to FIG. 6 and thus description thereof will not be repeated. The voltage VB of the battery 5 at the next start time can be estimated by estimating the amount of voltage drop ΔV (see Expression (1)).

In S212, the ECU 100 determines whether the voltage VB at the next start time of timer charging is equal to or higher than the threshold voltage TH2. When the voltage VB at the next start time of timer charging is equal to or higher than the threshold voltage TH2 (YES in S212), the ECU 100 transmits the full charged notification to the user by controlling the HMI 71 and/or the DCM 72 (S213).

On the other hand, when the voltage VB at the next start time is lower than the threshold voltage TH2 (NO in S212), the ECU 100 causes the vehicle 1 to stand by in a chargeable state in preparation for charging of the battery 5 at the next start time (S214).

As described above, according to the second embodiment, when the voltage VB of the battery 5 at the end time is equal to or higher than the threshold voltage TH2, it is also estimated whether the voltage VB of the battery 5 at the next start time of timer charging is equal to or higher than the threshold voltage TH2. When the voltage VB at the next start time of timer charging is estimated to be equal to or higher than the threshold voltage TH2, a full charged notification is transmitted to the user. Accordingly, similarly to the first embodiment, since the user can early ascertain that the battery 5 is in the fully charged state, it is possible to curb the user's feeling of inconvenience.

On the other hand, when the voltage VB at the next start time is estimated to be lower than the threshold voltage TH2, the vehicle 1 transitions to a stand-by state such that the battery 5 can be recharged at the next start time without transmitting a full charged notification to the user. Accordingly, the battery 5 can be brought as close to the fully charged state as possible at the next charging time and a cruising distance of the vehicle 1 can be extended (a so-called EV travelable distance).

In the first and second embodiments, timer charging of the battery 5 is performed. However, the same processes can also be performed in normal charging (so-called regular charging) in which a charging schedule is not set. In this case, the time at which starting conditions of external charging are satisfied is, for example, a time at which a user performs an operation of starting external charging. The time at which ending conditions of external charging are satisfied is, for example, a time at which the user performs an operation of ending external charging.

In the first and second embodiments, the processes of the flowcharts illustrated in FIGS. 5 and 8 are performed by the ECU 100 of the vehicle 1. However, the processes may be performed by the control unit 93 of the charging equipment 9. In this case, the user interface 91 and/or the communication module 92 correspond to a "notification device" in the claims of the disclosure.

It should be understood that the embodiments disclosed herein are exemplary but are not restrictive in all respects. The scope of the disclosure is not limited to description of the above-mentioned embodiments but is defined by the appended claims, and is intended to include all modifications within meanings and scopes equivalent to those of the claims.

What is claimed is:

1. A vehicle comprising:
a power storage device;
a notification device configured to notify a user of the vehicle that the power storage device has been fully charged by external charging; and
a control device configured to perform the external charging using electric power supplied from the outside of the vehicle, a first threshold voltage and a second threshold voltage which is lower than the first threshold voltage being set in the external charging, the control device being configured to:
permit start of the external charging when a voltage of the power storage device is lower than the second threshold voltage;
stop the external charging and notify the user that the power storage device has been fully charged using the notification device when the voltage of the power storage device is higher than the first threshold voltage during the external charging; and
after a period of time when the voltage of the power storage device remains lower than the first threshold voltage, notify the user that the power storage device has been fully charged using the notification device when the voltage of the power storage device is higher than the second threshold voltage.

2. The vehicle according to claim 1, wherein the external charging includes timed charging in a period from a predetermined start time to an end time, and
wherein the control device is configured to:
permit the start of the external charging when a start time of the timed charging arrives; and stop the external charging when an end time of the timed charging arrives.

3. The vehicle according to claim 2, wherein the control device is configured to:
   determine another start time after the end time of the timed charging when the voltage of the power storage device at the end time is lower than the second threshold voltage; and
   restart the external charging when the other start time arrives.

4. The vehicle according to claim 2, wherein the control device is configured to:
   estimate the voltage of the power storage device at another start time when the other start time is determined after the end time and the voltage of the power storage device at the end time is higher than the second threshold voltage; and
   notify the user that the power storage device has been fully charged when the estimated voltage is higher than the second threshold voltage.

5. The vehicle according to claim 4, wherein the control device is configured to cause the vehicle to stand by in preparation for the external charging at the other start time when the estimated voltage is lower than the second threshold voltage.

6. The vehicle according to claim 4, wherein the control device is configured to estimate the voltage of the power storage device at the other start time based on at least one of a charging voltage and a charging current of the power storage device and an outside air temperature during the external charging.

7. Charging equipment that supplies electric power for external charging of charging a power storage device which is mounted in a vehicle, the charging equipment comprising:
   a notification device configured to notify a user of the vehicle that the power storage device has been fully charged by the external charging; and
   a control device configured to control the notification device, a first threshold voltage and a second threshold voltage which is lower than the first threshold voltage being set in the external charging, the control device being configured to:
   permit start of supply of the electric power to the vehicle when a voltage of the power storage device is lower than the second threshold voltage;
   stop the supply of the electric power to the vehicle and notify the user that the power storage device has been fully charged using the notification device when the voltage of the power storage device is higher than the first threshold voltage during charging of the power storage device; and
   after a period of time when the voltage of the power storage device remains lower than the first threshold voltage, notify the user that the power storage device has been fully charged using the notification device when the voltage of the power storage device is higher than the second threshold voltage.

8. A charging method for a vehicle, in which the vehicle is configured to perform external charging of charging a power storage device with electric power which is supplied from the outside of the vehicle and a first threshold voltage and a second threshold voltage which is lower than the first threshold voltage are set in the external charging, the charging method comprising:
   a step of permitting start of charging of the power storage device when a voltage of the power storage device is lower than the second threshold voltage;
   a step of stopping the charging of the power storage device and notifying the user that the power storage device has been fully charged when the voltage of the power storage device is higher than the first threshold voltage during charging of the power storage device; and
   a step of notifying the user, after a period of time when the voltage of the power storage device remains lower than the first threshold voltage, that the power storage device has been fully charged when the voltage of the power storage device is higher than the second threshold voltage.

* * * * *